United States Patent
Etchegoyen

(10) Patent No.: US 9,141,489 B2
(45) Date of Patent: Sep. 22, 2015

(54) FAILOVER PROCEDURE FOR SERVER SYSTEM

(75) Inventor: Craig Stephen Etchegoyen, Irvine, CA (US)

(73) Assignee: Uniloc Luxembourg S.A., Luxembourg (LU)

( * ) Notice: Subject to any disclaimer, the term of this patent is extended or adjusted under 35 U.S.C. 154(b) by 65 days.

(21) Appl. No.: 12/813,420

(22) Filed: Jun. 10, 2010

(65) Prior Publication Data

US 2011/0010560 A1    Jan. 13, 2011

Related U.S. Application Data

(60) Provisional application No. 61/224,372, filed on Jul. 9, 2009.

(51) Int. Cl.

| | |
|---|---|
| H04L 29/06 | (2006.01) |
| G06F 11/20 | (2006.01) |
| H04L 12/26 | (2006.01) |
| H04L 12/701 | (2013.01) |
| H04L 12/703 | (2013.01) |

(52) U.S. Cl.
CPC ........ G06F 11/2025 (2013.01); H04L 43/0817 (2013.01); H04L 45/00 (2013.01); H04L 45/28 (2013.01); G06F 11/2038 (2013.01); G06F 11/2041 (2013.01)

(58) Field of Classification Search
USPC ......................................................... 726/22
See application file for complete search history.

(56) References Cited

U.S. PATENT DOCUMENTS

| | | | |
|---|---|---|---|
| 4,351,982 A | 9/1982 | Miller et al. | |
| 4,658,093 A | 4/1987 | Hellman | |
| 4,704,610 A | 11/1987 | Smith et al. | |
| 4,796,220 A | 1/1989 | Wolfe | |
| 5,210,795 A | 5/1993 | Lipner et al. | |

(Continued)

FOREIGN PATENT DOCUMENTS

| | | |
|---|---|---|
| AU | 678985 | 6/1997 |
| EP | 1637958 | 3/2006 |

(Continued)

OTHER PUBLICATIONS

Patil, I3FS: An In-Kernel Integrity Checker and Intrusion Detection File System, 2004, retrieved from the Internet <URL: usenix.org/events/lisa04/tech/full_papers/patil/patil_html/>, pp. 1-22 as printed.*

(Continued)

*Primary Examiner* — Michael Chao
(74) *Attorney, Agent, or Firm* — Sean D. Burdick

(57) ABSTRACT

A failover procedure for a computer system includes steps for routing traffic from a routing device to a first server, storing in the routing device data representing a fingerprint of the first server, receiving periodically at the routing device a status message from the first server, detecting at the routing device an invalid status message from the first server by absence of the fingerprint in a status message from the first server within a predetermined time period after last receiving a valid status message, and routing the traffic from the routing device to a second server in response to detecting the invalid status message from the first server. A redundant server system implementing the failover procedure may include servers each capable of generating its fingerprint by reading current system configuration data.

17 Claims, 4 Drawing Sheets

(56) References Cited

U.S. PATENT DOCUMENTS

| | | | |
|---|---|---|---|
| 5,291,598 A | 3/1994 | Grundy | |
| 5,414,269 A | 5/1995 | Takahashi | |
| 5,418,854 A | 5/1995 | Kaufman et al. | |
| 5,440,635 A | 8/1995 | Bellovin et al. | |
| 5,490,216 A | 2/1996 | Richardson, III | |
| 5,666,415 A | 9/1997 | Kaufman | |
| 5,745,879 A | 4/1998 | Wyman | |
| 5,754,763 A | 5/1998 | Bereiter | |
| 5,790,664 A | 8/1998 | Coley et al. | |
| 5,852,724 A * | 12/1998 | Glenn et al. | 709/239 |
| 5,925,127 A | 7/1999 | Ahmad | |
| 5,974,150 A | 10/1999 | Kaish et al. | |
| 6,009,401 A | 12/1999 | Horstmann | |
| 6,044,471 A | 3/2000 | Colvin | |
| 6,158,005 A | 12/2000 | Bharathan et al. | |
| 6,173,311 B1 * | 1/2001 | Hassett et al. | 709/202 |
| 6,202,170 B1 | 3/2001 | Busschbach et al. | |
| 6,230,199 B1 | 5/2001 | Revashetti et al. | |
| 6,233,567 B1 | 5/2001 | Cohen | |
| 6,243,468 B1 | 6/2001 | Pearce et al. | |
| 6,243,469 B1 | 6/2001 | Kataoka et al. | |
| 6,294,793 B1 | 9/2001 | Brunfeld et al. | |
| 6,330,670 B1 | 12/2001 | England et al. | |
| 6,449,645 B1 | 9/2002 | Nash | |
| 6,536,005 B1 | 3/2003 | Augarten | |
| 6,785,825 B2 | 8/2004 | Colvin | |
| 6,804,257 B1 | 10/2004 | Benayoun et al. | |
| 6,826,690 B1 | 11/2004 | Hind et al. | |
| 6,859,793 B1 | 2/2005 | Lambiase | |
| 6,920,567 B1 | 7/2005 | Doherty et al. | |
| 6,940,422 B1 | 9/2005 | Bachelder et al. | |
| 6,976,009 B2 | 12/2005 | Tadayon et al. | |
| 7,032,110 B1 | 4/2006 | Su et al. | |
| 7,069,440 B2 | 6/2006 | Aull | |
| 7,069,595 B2 | 6/2006 | Cognigni et al. | |
| 7,085,741 B2 | 8/2006 | Lao et al. | |
| 7,117,526 B1 | 10/2006 | Short | |
| 7,188,241 B2 | 3/2007 | Cronce et al. | |
| 7,203,966 B2 | 4/2007 | Abburi et al. | |
| 7,206,765 B2 | 4/2007 | Gilliam et al. | |
| 7,272,728 B2 | 9/2007 | Pierson et al. | |
| 7,305,562 B1 | 12/2007 | Bianco et al. | |
| 7,310,813 B2 | 12/2007 | Lin et al. | |
| 7,319,987 B1 | 1/2008 | Hoffman et al. | |
| 7,327,280 B2 | 2/2008 | Bachelder et al. | |
| 7,337,147 B2 | 2/2008 | Chen et al. | |
| 7,343,297 B2 | 3/2008 | Bergler et al. | |
| 7,463,945 B2 | 12/2008 | Kiesel et al. | |
| 7,506,056 B2 * | 3/2009 | Satish et al. | 709/225 |
| 7,653,899 B1 | 1/2010 | Lindahl et al. | |
| 7,698,416 B2 * | 4/2010 | Potti et al. | 709/224 |
| 7,739,402 B2 | 6/2010 | Roese | |
| 7,836,121 B2 | 11/2010 | Elgressy et al. | |
| 7,852,861 B2 | 12/2010 | Wu et al. | |
| 2001/0034712 A1 | 10/2001 | Colvin | |
| 2001/0044782 A1 | 11/2001 | Hughes et al. | |
| 2002/0019814 A1 | 2/2002 | Ganesan | |
| 2002/0082997 A1 | 6/2002 | Kobata et al. | |
| 2002/0161718 A1 | 10/2002 | Coley et al. | |
| 2003/0033541 A1 | 2/2003 | Edmark et al. | |
| 2003/0063750 A1 * | 4/2003 | Medvinsky et al. | 380/277 |
| 2003/0065918 A1 | 4/2003 | Willey | |
| 2003/0126240 A1 * | 7/2003 | Vosseler | 709/221 |
| 2003/0163734 A1 * | 8/2003 | Yoshimura et al. | 713/201 |
| 2003/0172035 A1 | 9/2003 | Cronce et al. | |
| 2003/0217289 A1 | 11/2003 | Ammon et al. | |
| 2003/0237004 A1 | 12/2003 | Okamura | |
| 2004/0024860 A1 | 2/2004 | Sato et al. | |
| 2004/0030912 A1 | 2/2004 | Merkle et al. | |
| 2004/0059929 A1 | 3/2004 | Rodgers et al. | |
| 2004/0107360 A1 | 6/2004 | Herrmann et al. | |
| 2004/0143746 A1 | 7/2004 | Ligeti et al. | |
| 2004/0148397 A1 | 7/2004 | Aronoff et al. | |
| 2004/0187018 A1 | 9/2004 | Owen et al. | |
| 2004/0196162 A1 | 10/2004 | Brooke | |
| 2004/0215661 A1 | 10/2004 | Zhang et al. | |
| 2005/0033957 A1 | 2/2005 | Enokida | |
| 2005/0050531 A1 | 3/2005 | Lee | |
| 2005/0055552 A1 | 3/2005 | Shigeeda | |
| 2005/0071391 A1 * | 3/2005 | Fuerderer et al. | 707/204 |
| 2005/0108173 A1 | 5/2005 | Stefik et al. | |
| 2005/0138155 A1 | 6/2005 | Lewis | |
| 2005/0172161 A1 | 8/2005 | DeLaCruz et al. | |
| 2005/0172280 A1 | 8/2005 | Ziegler et al. | |
| 2005/0264431 A1 | 12/2005 | Bachelder | |
| 2006/0026442 A1 | 2/2006 | Ittogi | |
| 2006/0072444 A1 | 4/2006 | Engel et al. | |
| 2006/0095454 A1 | 5/2006 | Shankar et al. | |
| 2006/0130135 A1 | 6/2006 | Krstulich et al. | |
| 2006/0161914 A1 | 7/2006 | Morrison et al. | |
| 2006/0230317 A1 | 10/2006 | Anderson | |
| 2006/0265337 A1 | 11/2006 | Wesinger, Jr. | |
| 2006/0265758 A1 | 11/2006 | Khandelwai et al. | |
| 2006/0280207 A1 * | 12/2006 | Guarini et al. | 370/524 |
| 2006/0282511 A1 | 12/2006 | Takano et al. | |
| 2007/0136726 A1 | 6/2007 | Freeland et al. | |
| 2007/0168288 A1 | 7/2007 | Bozeman | |
| 2007/0198422 A1 | 8/2007 | Prahlad et al. | |
| 2007/0203846 A1 | 8/2007 | Kavuri et al. | |
| 2007/0219917 A1 | 9/2007 | Liu et al. | |
| 2007/0255947 A1 | 11/2007 | Choudhury et al. | |
| 2007/0282615 A1 | 12/2007 | Hamilton et al. | |
| 2008/0065552 A1 | 3/2008 | Elazar et al. | |
| 2008/0074289 A1 | 3/2008 | Sauder et al. | |
| 2008/0084877 A1 | 4/2008 | Brzozowski | |
| 2008/0086423 A1 | 4/2008 | Waites | |
| 2008/0147556 A1 | 6/2008 | Smith et al. | |
| 2008/0228578 A1 | 9/2008 | Mashinsky | |
| 2008/0320607 A1 | 12/2008 | Richardson | |
| 2009/0083730 A1 | 3/2009 | Richardson | |
| 2009/0138975 A1 | 5/2009 | Richardson | |

FOREIGN PATENT DOCUMENTS

| | | |
|---|---|---|
| EP | 1637961 | 3/2006 |
| EP | 1670188 | 6/2006 |
| EP | 1 912 413 | 4/2008 |
| WO | WO 9220022 | 11/1992 |
| WO | WO 9301550 | 1/1993 |
| WO | WO 9535533 | 12/1995 |
| WO | WO 0067095 | 11/2000 |
| WO | 2004023620 A1 | 3/2004 |
| WO | WO 2005/094544 | 10/2005 |
| WO | WO 2005104686 | 11/2005 |
| WO | WO 2006/138393 | 12/2006 |
| WO | WO2007060516 | 5/2007 |
| WO | WO 2007/022134 | 7/2007 |
| WO | WO2008013504 | 1/2008 |
| WO | WO 2008/118074 | 10/2008 |
| WO | WO2008157639 | 12/2008 |
| WO | WO2009039504 | 3/2009 |
| WO | WO2009065135 | 5/2009 |
| WO | WO2009076232 | 6/2009 |
| WO | WO2009105702 | 8/2009 |
| WO | WO2009143115 | 11/2009 |
| WO | WO2009158525 | 12/2009 |

OTHER PUBLICATIONS

Williams, R., "A Painless Guide to CRC Error Detection Algorithms", Ver. 3, Aug. 19, 1993.

Angha, F. et al., "Securing Transportation Network Infrastructure with Patented Technology of Device Locking—Developed by Uniloc USA", avail. at: http://www.dksassociates.com/admin/paperfile/ITS%20World%20Paper%20Submission_Uniloc%20_2_.pdf, Oct. 24, 2006.

Econolite, "Econolite and Uniloc Partner to Bring Unmatched Infrastructure Security to Advanced Traffic Control Networks with Launch of Strongpoint", avail. at: http://www.econolite.com/docs/press/20080304_Econolite_StrongPoint.pdf, Mar. 4, 2008.

(56) References Cited

OTHER PUBLICATIONS

Luo et al. "Ariadne: An Eclipse-based System for Tracking the Originality of Source Code," IBM Systems Journal, 2007, vol. 46, No. 2, pp. 289-303.
Wikipedia: "Software Extension," May 28, 2009, Internet Article retrieved on Oct. 11, 2010. XP002604710.

H. Williams, et al., "Web Database Applications with PHP & MySQL", Chapter 1, "Database Applications and the Web", ISBN 0-596-00041-3, O'Reilly & Associates, Inc., Mar. 2002, avail. at: http://docstore.mik.ua/orelly/webprog/webdb/ch01_01.htm. XP002603488.

* cited by examiner

FAILOVER PROCEDURE FOR SERVER SYSTEM

This application claims priority to U.S. Provisional Application No. 61/224,372 which was filed Jul. 9, 2009 and which is fully incorporated herein by reference.

BACKGROUND

1. Field

The present disclosure relates to methods and systems for managing failover events in computer servers.

2. Description of Related Art

Failover is a backup operational mode in which the functions of a system component (such as a processor, server, network, or database, for example) are assumed by secondary system components when the primary component becomes unavailable through either failure or scheduled down time. Failover protocols and components are often implemented for mission-critical systems that must be constantly available or for busy commercial systems in which down time causes substantial lost income or expenses. A failover procedure transfers tasks to a standby system component so that failover is not discernable, or is only minimally discernable, to the end user. Failover events are triggered when a failure of a primary component is detected, causing the failover protocol to be implemented to shift tasks to the designated back-up component. Automatic failover procedures maintain normal system functions despite unplanned equipment failures.

Modern server systems, such as the storage area network (SAN), enable any-to-any connectivity between servers and data storage systems but require redundant sets of all the components involved. Multiple connection paths, each with redundant components, are used to help ensure that the connection is still viable even if one (or more) paths fail. Multiple redundancies increase the chances that a failover event will not be disruptive, but increase system capital and operating costs. In systems with fewer redundancies, or where it is deemed undesirable to maintain more than one active component at any given instant of time, rapid failure detection is key to triggering a seamless failover response. Current failover systems rely on monitoring the "heartbeat" of a primary component by the backup component; that is, the components communicate by exchanging packets called "heartbeats" at regular periods, for example approximately 2 Hz (twice per second). If the primary component fails, the secondary node will fail to receive the expected heartbeat packet, which immediately triggers a transfer of the primary role to the backup component. This prevents file corruption caused by multiple competing primary components. Notwithstanding the advantages of present failover systems, it is desirable to provide an improved failover system and procedures.

SUMMARY

The present technology provides for automatic failover in systems having at least one primary (active) and at least one secondary (stand-by) server, and at least one (typically two or more) routing appliance routing traffic to the primary and secondary servers. The system may be implemented over a public network, for example, a network using TCP/IP protocol. The primary and secondary servers are configured with identical applications, and maintain duplicate databases of all data required for operation that are synchronized continuously or periodically at all times both servers are active. Each routing appliance maintains IP addresses for the primary and secondary servers. These IP addresses are configurable at any desired time, for example via the system's enterprise messaging system (EMS), which enables asynchronous (queued) messaging between system applications. One of the IP addresses is indicated as the primary server and the other IP address is indicated for the secondary server. The routing appliance maintains a secure tunnel to both IP addresses, but routes all incoming traffic to the IP address of the currently designated primary server.

Each routing appliance actively monitors the operational state of the currently designated primary server and the secondary server, using keep-alive signals. A keep-alive signal, also called a heartbeat, may be transmitted to each routing appliance every 200 ms or less from the primary and secondary servers, respectively. In addition, the secure tunnels may be maintained using a periodic challenge/response protocol as available, for example, in OpenVPN™ using TLS authentication.

The secondary server also actively monitors the operational state of the primary server. The primary server generates and transmits the keep-alive signal to the secondary server in parallel with signals sent to the routing appliances. Therefore when a failure of the primary server occurs, the routing appliances and the primary server detect the failure virtually simultaneously.

In response to detecting failure of the primary server, each routing appliance switches all traffic to the secondary server, which assumes the role of the primary server. This is quickly accomplished through use of the secure tunnel maintained from each routing appliance to the secondary server. In parallel, the routing appliance makes repeated attempts to establish a secure tunnel to the failed primary server. When the failed server comes back online, the routing appliance will establish a secure tunnel to the recovered server, but does not route traffic through it. The failed and recovered server instead becomes the new stand-by server for the former secondary server, to which traffic is now being routed through the stand-by secure tunnels by the routing appliances.

In concert with the switching by the routing appliances, when the secondary server detects that its primary peer has failed, the secondary server takes over as the active server. For example, a secure proxy application on the secondary server communicates with a network (Web) application also on the secondary server. Also, the secondary (now active) server continuously monitors for the failed server to recover, and upon detecting recovery to a ready state, restores database synchronization procedures to restore data mirroring between the active and stand-by servers.

Once the transfer to the stand-by server is executed, all system components and clients serviced by the system should be communicating with the former stand-by server now assuming the active server role, via the routing appliances. Configuration of the routing appliances and the use of the secure tunnels between the servers and routing appliances are important features for ensuring optimum operability of the failover system. Use of the secure tunnels may allow system architecture to extend beyond the subnet (sub-network) level of components, computers and devices that have a common, designated IP address routing prefix. Routing appliances beyond the subnet are able to recognize the origin of server status keep-alive signals received via the secure tunnels. After configuration, status messages received via the secure tunnels can be readily recognized by any routing appliance, regardless of network location. When a failure occurs, routing appliances that are distant (in network topology terms) from the primary and secondary servers can quickly reroute traffic to the stand-by server. Also, operational overhead is reduced because packet exchange is not required, and the quantity of routing appliances in use is consequently more easily scaled up.

A more complete understanding of the failover procedures and system will be afforded to those skilled in the art, as well as a realization of additional advantages and objects thereof, by a consideration of the following detailed description. Reference will be made to the appended sheets of drawings which will first be described briefly.

BRIEF DESCRIPTION OF THE DRAWINGS

Throughout the several figures and in the specification that follows, like element numerals are used to indicate like elements appearing in one or more of the figures.

DETAILED DESCRIPTION

The present technology provides for implementing failover in a redundant computer system, using failure monitoring using coordinated switching in response to detection of failure.

Figure 1:
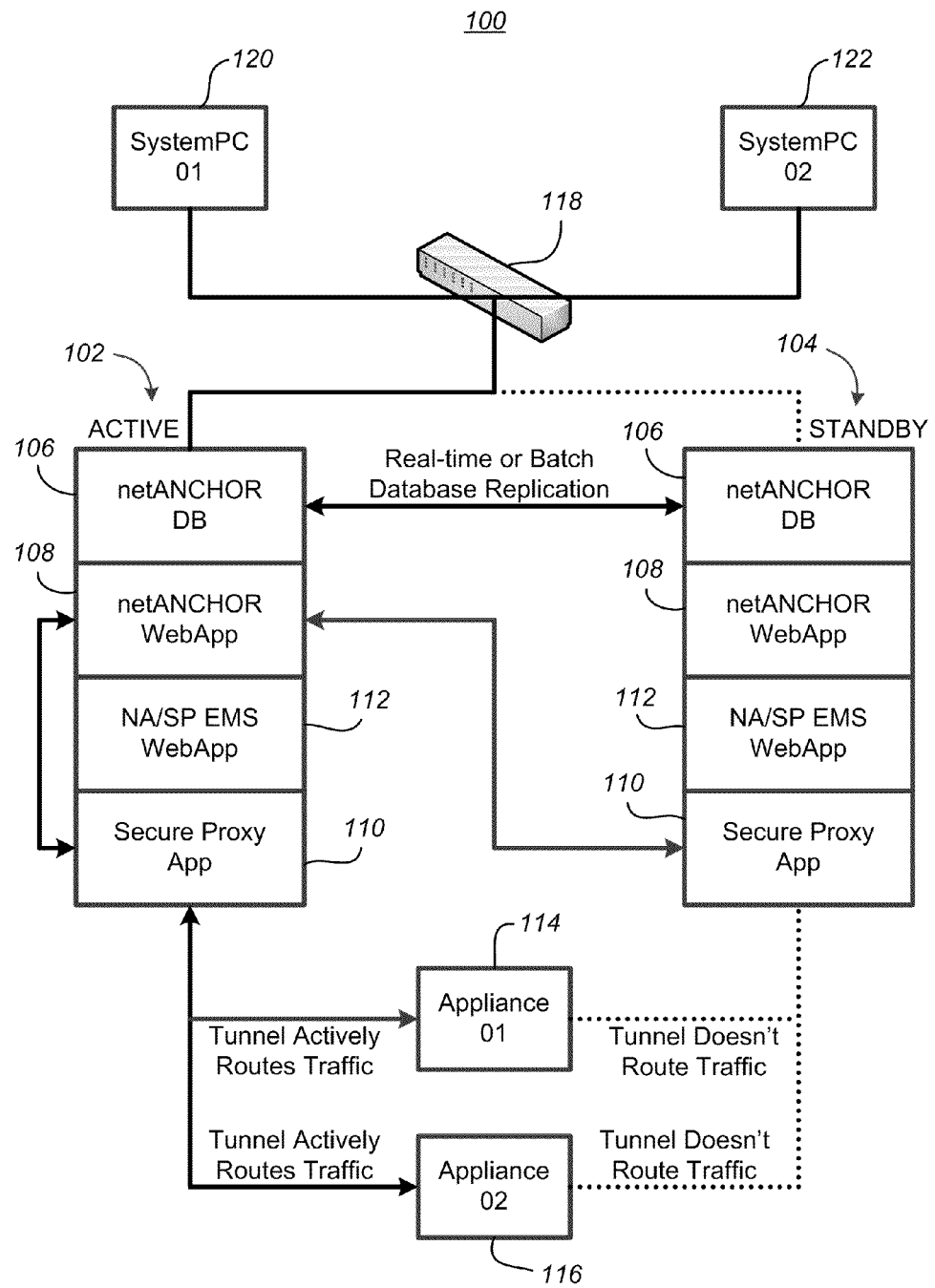
FIG. 1 is a block diagram of one embodiment of the invention showing elements for implementing a failover procedure in a computer system having redundant servers.

FIG. 1 shows a single-server deployment system 100, comprising a first server 102 and a second server 104, in an operational state where server 102 is the designated active or primary server and server 104 is the standby or secondary server. Each server 102, 104 may be configured with duplicate components: a database 106, web server component 108, a secure proxy server component 110 operating as proxy for the web server component 108, and an enterprise messaging service (EMS) 112 handling asynchronous messaging between the web server component 108 and the proxy server 110. First server 102 and second server 104 exchange data using a real-time or batch protocol for replication of the database 106, whenever both servers are operational. The database maintained by the primary server 102 is replicated at the standby server, preferably as close to real-time as is feasible. Similarly, the web application 108 operating on the active server 102 maintains communications with the proxy component 110 at both the active and standby server to maintain its operational readiness in the case of failover.

EMS component 112 may be used to exchange information with other server components and with at least one routing appliance 114, or at least two routing appliances 114, 116. Any non-zero number of routing devices may be used. If multiple routers are used, each may be configured as described herein for the at least one router 114. Each routing appliance maintains IP addresses for the first and second servers 102, 104 in internal memory. These stored addresses may be configurable via EMS 112. Each routing device 114 may further include a failure detection algorithm that operates to detect a failure of the active server, in response to which the router switches traffic to the former stand-by server, e.g., server 104. The former standby server becomes the new active server until it fails, while after the former active server 102 comes back on line, it becomes the new stand-by server.

System 100 may further include one or more switches 118 connected to both servers 102, 104 and to a plurality of clients 120, 122 each running a redundant failover application. Clients 120, 122 manage failover events via switch 118. Routing devices 114, 116 may communicate with the active server 102 via a VPN secure tunnel implemented over a public network. The routing devices also maintain a secure tunnel to the stand-by server 104 ready for use, but do not route traffic through this tunnel until a failover event occurs. Routing devices 114, 116 may be located outside of the subnet that contains servers 102 and 104. In the alternative, one or more of the routing devices may be located inside the subnet. The active server generates a periodic keep-alive signal at a defined frequency, for example 'N' times per second, where 'N' is a number between 1 and 100, for example, 5. This keep-alive signal may be transmitted to the routing appliances 114, 116. The stand-by server may similarly provide a keep-alive signal to these appliances. Servers 102, 104 may exchange a keep-alive signal or equivalent status message at a lower frequency, for example, once per second. The active server transmits the keep-alive signal via a secure communication channel to each routing device 114, 116 and to the standby server 104. The receiving device recognizes the keep-alive signal and thereby confirms that the no failure condition has occurred. If the receiving device fails to receive a status message within a defined time period of the last status message received, then the device may treat this as indicating a failure condition on the server and initiate failover procedures.

In alternative embodiments, keep-alive signals from the primary or secondary server may include a hardware fingerprint for the originating device. As used herein, a hardware fingerprint is data characterized by being reliably reproducible by an application operating on a particular client machine, while being virtually irreproducible by any other means, and virtually impossible to guess using any systematic or brute force algorithm. In short, each fingerprint is a complex and unique data pattern generated from a stable system configuration of a particular client machine. Methods for generating a machine fingerprint are discussed in the detailed description below. Hence, the fingerprinted status message confirms operational status of the originating server. The server may generate and transmit these status messages according to a designated frequency (for example, 12 times per hour, or less frequently) to each routing appliance. Each message may consist of or comprise a brief header, time stamp, and machine fingerprint. The machine fingerprint positively identifies the source of the status message. No packet exchange is required.

At least one application running on each of servers 102, 104 or otherwise accessing each server's hardware and file system may generate a machine fingerprint. This may be done whenever a system server is configured or booted up, and a copy of the fingerprint saved in a temporary file for use in generating status messages as described above for alternative embodiments. The application may generate the fingerprint data using a process that operates on data indicative of the server's configuration and hardware. The fingerprint data may be generated using user-configurable machine parameters, non-user-configurable machine parameters, or both as input to a process that generates a fingerprint data file as binary data.

Each machine parameter indicates a state or identifier for a hardware component, software component, or data component of the server. To obtain stable fingerprint data, relatively stable or static machine parameters should be selected. The machine parameters may be selected such that the resulting fingerprint data has a very high probability (e.g., greater than 99.999%) of being unique to the server. In addition, the machine parameters may be selected such that the fingerprint data includes at least a stable unique portion up to and including the entire identifier that has a very high probability of remaining unchanged during normal operation of the server. The resulting fingerprint data should be highly specific, unique, reproducible and stable as a result of properly selecting the machine parameters.

For example, a server may comprise a motherboard on which reside a CPU and one or more auxiliary processors. The CPU may comprise a cache memory in communication with a random access memory (RAM). A video processor may communicate with these components via Northbridge hub and provide video data through video RAM to a display device. Other components may communicate with the CPU via a Southbridge hub, such as, for example a BIOS read-only memory or flash memory device, one or more bus bridges, a network interface device, and a serial port. Each of these and other components may be characterized by some data or parameter settings that may be collected using the CPU and used to characterize the server device.

To generate the fingerprint, a fingerprint application operating on the server may perform a system scan to determine a present configuration of the computing device. The application may then select the machine parameters to be used as input for generating the unique fingerprint data. Selection of parameters may vary depending on the system configuration. Once the parameters are selected, the application may generate the identifier.

Illustrative examples of various machine parameters that may be accessible to an application or applications running on or interacting with a processor of the client machine include: machine model; machine serial number; machine copyright; machine ROM version; machine bus speed; machine details; machine manufacturer; machine ROM release date; machine ROM size; machine UUID; and machine service tag. For further example, these machine parameters may include: CPU ID; CPU model; CPU details; CPU actual speed; CPU family; CPU manufacturer; CPU voltage; and CPU external clock; memory model; memory slots; memory total; and memory details; video card or component model; video card or component details; display model; display details; audio model; and audio details; network model; network address; Bluetooth address; BlackBox model; BlackBox serial; BlackBox details; BlackBox damage map; BlackBox volume name; NetStore details; and NetStore volume name; optical drive model; optical drive serial; optical details; keyboard model; keyboard details; mouse model; mouse details; printer details; and scanner details; baseboard manufacturer; baseboard product name; baseboard version; baseboard serial number; and baseboard asset tag; chassis manufacturer; chassis type; chassis version; and chassis serial number; IDE controller; SATA controller; RAID controller; and SCSI controller; port connector designator; port connector type; port connector port type; and system slot type; cache level; cache size; cache max size; cache SRAM type; and cache error correction type; fan; PCMCIA; modem; portable battery; tape drive; USB controller; and USB hub; device model; device model IMEI; device model IMSI; and device model LCD; wireless 802.11; webcam; game controller; silicone serial; and PCI controller; machine model, processor model, processor details, processor speed, memory model, memory total, network model of each Ethernet interface, network MAC address of each Ethernet interface, BlackBox Model, BlackBox Serial (e.g., using Dallas Silicone Serial DS-2401 chipset or the like), OS install date, nonce value, and nonce time of day. The foregoing examples are merely illustrative, and any suitable machine parameters may be used.

Because many servers are mass-produced, using hardware parameters limited to the server box may not always provide the desired level of assurance that a fingerprint is unique. Use of user-configurable parameters may ameliorate this risk considerably, but at the cost of less stability. In addition, sampling of physical, non-user configurable properties for use as parameter input may also lessen the risk of generating duplicate fingerprint data. Physical device parameters available for sampling may include, for example, unique manufacturer characteristics, carbon and silicone degradation and small device failures.

Measuring carbon and silicone degradation may be accomplished, for example, by measuring a processor chip's performance in processing complex mathematical computations, or its speed in response to intensive time variable computations. These measurements depend in part on the speed with which electricity travels through the semi-conductor material from which the processor is fabricated. Using variable offsets to compensate for factors such as heat and additional stresses placed on a chip during the sampling process may allow measurements at different times to reproduce the expected values within a designated degree of precision. Over the lifetime of the processor, however, such measurements may change due to gradual degradation of the semi-conductor material. Recalibration or rewriting the fingerprint data may be used to compensate for such changes.

In addition to the chip benchmarking and degradation measurements, the process for generating a fingerprint data may include measuring physical, non-user-configurable characteristics of disk drives and solid state memory devices. For example, each data storage device may have damaged or unusable data sectors that are specific to each physical unit. A damaged or unusable sector generally remains so, and therefore a map of damaged sectors at a particular point in time may be used to identify a specific hardware device later in time. Data of this nature may also be included in a fingerprint file.

The application may read parameters from operating system data files or other data stored on the server, or actively obtain the parameters by querying one of more hardware components in communication with a processor on which the application is operating. A processor provided with at least one application operating in this fashion of gather the machine parameters may comprise a means for collecting and generating fingerprint data.

In addition, the process of generating a working machine fingerprint may include at least one irreversible transformation, such as, for example, a cryptographic hash function, such that the input machine parameters cannot be derived from the resulting fingerprint data. Each fingerprint data, to a very high degree of certainty, cannot be generated except by the suitably configured application operating or otherwise having had access to the same computing device for which the fingerprint data was first generated. Conversely, each fingerprint, again to a very high degree of certainty, can be successfully reproduced by the suitably configured application operating or otherwise having access to the same computing device on which the identifier was first generated.

Figure 2:
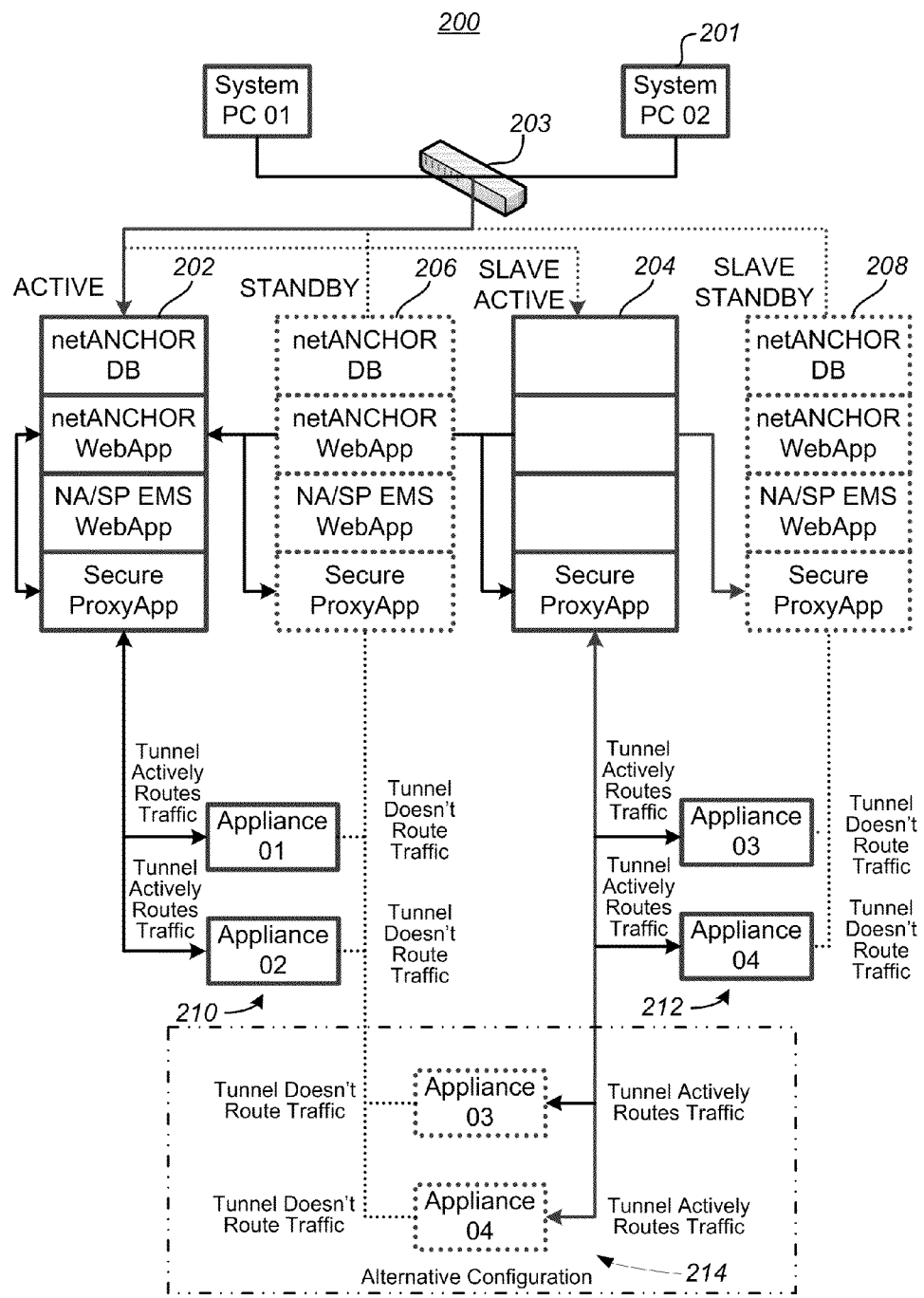
FIG. 2 is a block diagram of another embodiment of the invention showing elements for implementing a failover procedure in a computer system having redundant servers.

FIG. 2 shows a multiple server failover system 200. System 200 may comprise more than one active server and more than one standby server. The active servers may include a primary active server 202 and an active slave server 204. The stand-by servers may include a primary stand-by server 206 and a slave stand-by server 208. Traffic routing between servers 202 and 206 is handled by routers 210 in the manner described above for system 100. If these routers detect failure of server 202, all traffic is routed to server 206, which becomes the active server. Routers 212 manage routing between the slave servers 204 and 208. Routers 210 and 212 may be configured to switch all traffic to the standby server 206 and slave 208 upon the failure of either primary 202 or slave 204. In the alternative, the routers 210 and 212 may operate independently so that server 206 becomes the primary server only if active primary 202 fails, and slave 209 becomes active only if slave 204 fails. An alternative configuration is shown at the bottom of FIG. 2, in which routing appliances 214 handle routing and failover switching between standby 206 and slave 204. In this alternative configuration, the one and only standby server in system 200 is server 206, which can serve as standby for either the active primary server 202 or its slave 204.

Figure 3:
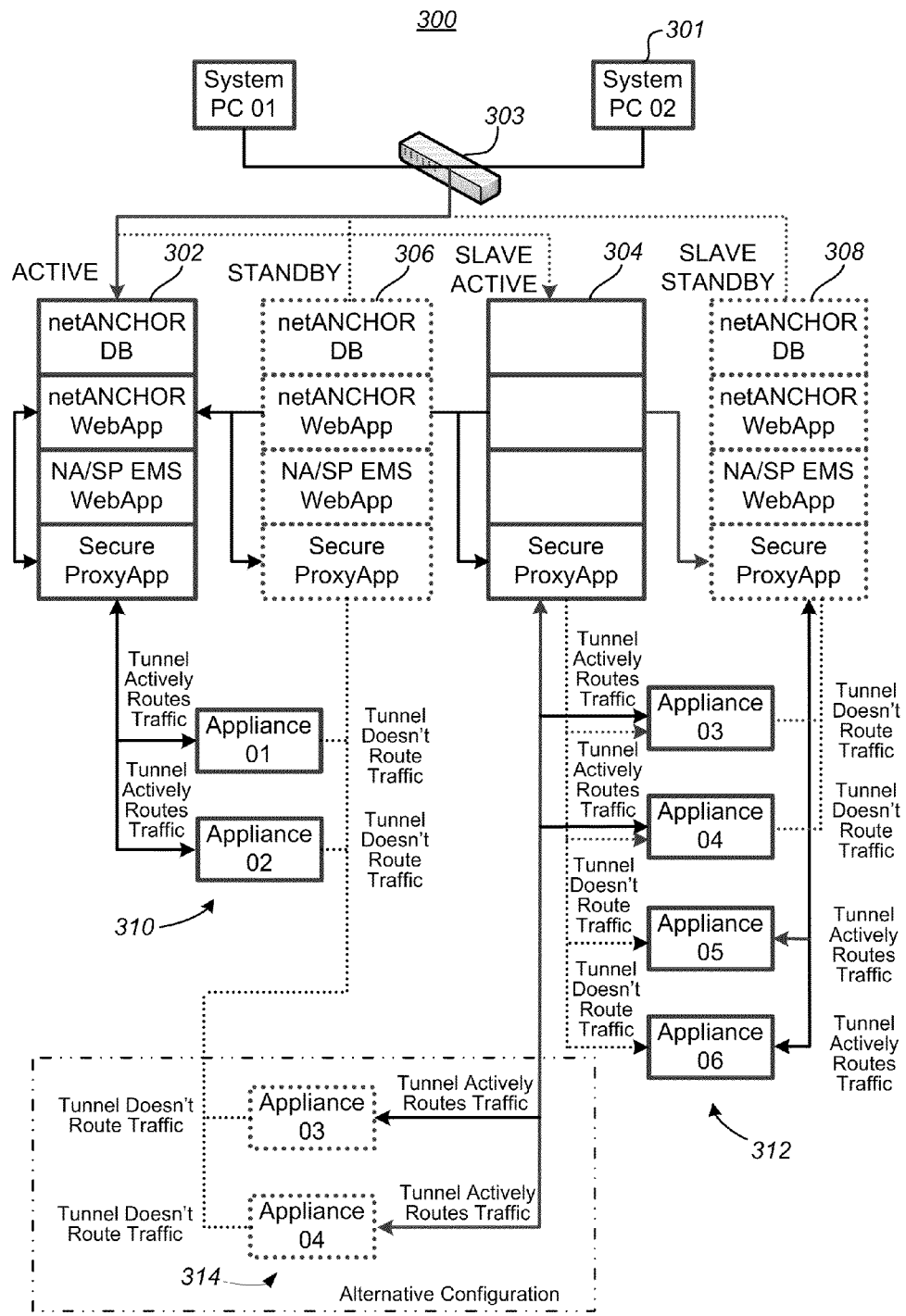
FIG. 3 is a block diagram of third embodiment of the invention showing elements for implementing a failover procedure in a computer system having redundant servers.

FIG. 3 shows an alternative multiple server failover system 300. System 300 may comprise more than one active server and more than one standby server. The active servers may include a primary active server 302 and any number of active slave servers 304. The stand-by servers may include a primary stand-by server 306 and a slave stand-by server 308. Traffic routing between servers 302 and 306 is handled by routers 310 in the manner described above for system 100. If these routers detect failure of server 302, all traffic is routed to server 306, which becomes the active server. Routers 312 manage routing between the slave servers bi-directionally. Either slave 304, 308 can serve as active stand-by or active for the other slave. In embodiments using either active slave as the secondary server for each routing appliance, a total of two routing appliances may suffice. An alternative configuration is shown at the bottom of FIG. 3, in which routing appliances 314 handle routing and failover switching between standby 306 and slave 304. In this alternative configuration, the one and only standby server in system 300 is server 306, which can serve as standby for either the active primary server 302 or its slave 304.

Failure monitoring and detection may be handled by the routing appliances and standby servers in systems 200 and 300 as in system 100. Active servers generate and transmit a keep-alive signal at a defined frequency. In the multiple server embodiments, the slave active servers run the secure proxy application only, which communicates with the web application operating on the primary active server. In the event the primary server goes down, the active slave (whether primary slave 204/304 or secondary slave 208/308, if active) is configured to communicate with the web application residing on the secondary server 206.

In all systems 100, 200 and 300, communication from system computers 201, 301 should not be disrupted in the event that any active server goes down, whether slave or not.

Figure 4:
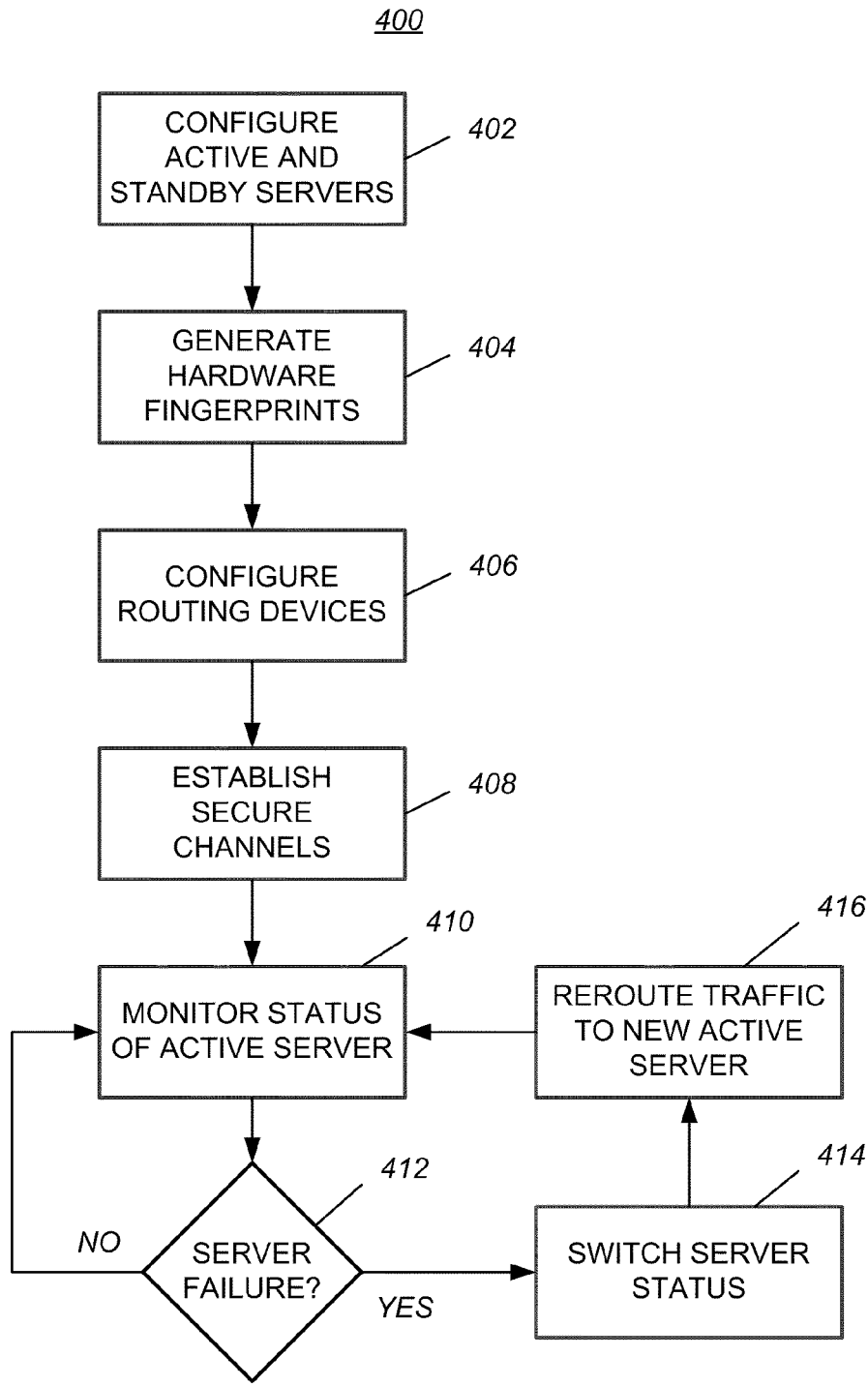
FIG. 4 is a flow chart illustrating a process according to the invention for implementing failover in a system having redundant servers.

FIG. 4 shows example elements of a method 400 for failover management in a server system. Instructions for performing the method may be encoded in a computer-readable medium. When the medium is read by a computer and the instructions are loaded into a computer memory for execution by at least one processor, the instructions may cause the described components to perform the described actions. A computer-readable medium may include but is not limited to magnetic storage devices (e.g., hard disk, floppy disk, magnetic strips, etc.), optical discs (e.g., compact disc (CD), digital versatile disc (DVD), etc.), smart cards, and flash memory devices (e.g., Erasable Programmable Read Only Memory (EPROM), card, stick, key drive, etc.). Additionally, various storage media described herein can represent one or more devices and/or other computer-readable media for storing information.

Initially, first and second servers are configured 402 as duplicate peer servers, including at least an application for servicing network requests and optionally, a database, enterprise messaging system, and proxy server applications. The servers are configured to replicate the database of the active peer. Only one of the servers is allowed to be active at any one time, the other operates in a standby mode. Both peers are able to switch from standby to primary mode in response to detecting that its peer has failed or gone down. Each peer's default mode after resetting is stand-by mode.

Each peer may optionally generate a machine fingerprint 404 at initialization, such as after any reset or rebooting event. These fingerprints may be generated in any suitable manner as described herein. Each peer stores its own fingerprint in a local memory. Initially, one of the peers operates in active mode and the other operates in standby mode. The active server may transmit the machine fingerprint to the routing devices at a defined frequency. The standby server may also transmit its fingerprint.

Routing appliances are configured 406 by storing the IP addresses of the active and primary servers and receiving, at system initialization, an indication of which server is designated the active server. The routers may be configured with instructions for receiving keep-alive signals, detecting server failure using these signals, and initiating failover procedures in response detecting server failure In some embodiments, the routers may also receive a copy of each server fingerprint and may be configured with instructions for receiving the fingerprint-signed status messages from the servers. At 408, the router devices establish secure communication channels to each server, using a secure VPN tunnel. Each router is configured to route all traffic to the currently designated active server, also secure channels are maintained to both.

Each routing device and the standby server monitor current status of the active server by receiving and status messages and detecting when the status message stream is interrupted. If the router detects an interruption in the message stream 412, the router switches 414 the server status such that the stand-by server becomes the new active server. The router routes all traffic 416 to the new standby server 416, establishes a secure communication channel 408 with the other server as soon as it comes back on line, and resumes status monitoring 410.

Based on the foregoing, a failover procedure according to an exemplary embodiment of the invention may be expressed as a series of salient process steps, as follows: a step for routing traffic from a routing device to a first server, a step for storing in the routing device data representing a fingerprint of the first server, a step for receiving periodically at the routing device a status message from the first server, a step for detecting at the routing device an invalid status message from the first server by absence of the fingerprint in a status message from the first server within a predetermined time period after last receiving a valid status message at the routing device, and a step for routing the traffic from the routing device to a second server in response to detecting the invalid status message from the first server. The steps may be performed in a sequence other than the sequence expressed without departing from the invention.

Having thus described a preferred embodiment of a method and system for failover management in a server system, it should be apparent to those skilled in the art that certain advantages of the within system have been achieved. It should also be appreciated that various modifications, adaptations, and alternative embodiments thereof may be made without departing from the scope and spirit of the present technology. The following claims define the scope of what is claimed.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

It is understood that the specific order or hierarchy of steps in the processes disclosed herein in an example of exemplary approaches. Based upon design preferences, it is understood that the specific order or hierarchy of steps in the processes may be rearranged while remaining within the scope of the present disclosure. The accompanying method claims present elements of the various steps in sample order, and are not meant to be limited to the specific order or hierarchy presented.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

What is claimed is:

1. A method for implementing a failover procedure for a computer system, comprising:
   routing traffic from a routing device to a first server;
   storing in the routing device data representing a fingerprint of the first server;
   receiving periodically at the routing device a status message from the first server;
   detecting at the routing device an invalid status message from the first server by absence of the fingerprint in a status message from the first server within a predetermined time period after last receiving a valid status message at the routing device; and
   routing the traffic from the routing device to a second server in response to detecting the invalid status message from the first server.

2. The method of claim 1, wherein the detecting step further comprises comparing the status message received from the first server to the fingerprint stored on the routing device and determining that the status message is valid only if a fingerprint encoded in the status message received matches the fingerprint stored in the routing device.

3. The method of claim 2, further comprising
   storing in the routing device data representing a fingerprint of the second server;
   receiving periodically at the routing device a status message from the second server;
   detecting at the routing device an invalid status message from the second server by absence of the second server fingerprint in a status message from the second server within a predetermined time period after last receiving a valid status message at the routing device; and
   routing the traffic from the routing device to the first server in response to detecting the invalid status message from the second server.

4. The method of claim 2, further comprising, after receiving an invalid status message from the first server, restoring a secure tunnel from the routing device to the first server in response to detecting a valid status signal from the first server.

5. The method of claim 4, further comprising generating the fingerprint at the first server in response to routing the traffic from the routing device to the second server.

6. The method of claim 1, further comprising generating the fingerprint at the first server by reading system data indicating a current system configuration of the first server.

7. The method of claim 6, further comprising generating the first fingerprint by encrypting at least a portion of the system data using a cryptographic key.

8. The method of claim 1, further comprising transmitting the status message to the routing device via a secure tunnel.

9. A redundant server system with failover capability, comprising:
   a first server and a second server, each configured with a first application for serving data to multiple clients and a second application for generating periodic status messages, each status message including a server fingerprint;
   a routing device in secure communication with the first server and the second server, the routing device configured
   to route traffic exclusively to a primary server of the first and second servers,
   to receive the status messages from the first and second servers,
   to compare the server fingerprint of a status message with a server fingerprint stored on the routing device; and
   to change the primary server to another of the first and second servers in response to a comparison of the primary server fingerprint yielding a mismatch prior to the change.

10. The system of claim 9, wherein each of the first and second servers are each configured with an application for generating a hardware fingerprint by reading server system data indicating a current system configuration.

11. The system of claim 10, wherein the application for generating a hardware fingerprint is further configured for generating the hardware fingerprint by encrypting at least a portion of the server system data using a cryptographic key.

12. The system of claim 9, wherein the mismatch indicates the primary server is in a failure condition, and wherein each of the first and second servers is further configured to periodically transmit the status messages to the routing device at a designated frequency whenever not in a failure condition.

13. The system of claim 9, wherein the mismatch indicates the primary server is in a failure condition, and wherein each of the first and second servers further comprises a database replicating data stored in another of the first and second servers when neither one of the first and second servers is in a failure condition.

14. The system of claim 9, wherein each of the first and second servers further comprises a proxy server application managing communications with the routing device.

15. The system of claim 9, further comprising a second routing device in secure communication with the first server and the second server, the second routing device configured
- to route traffic exclusively to a primary server of the first and second servers,
- to receive the status messages from the first and second servers,
- to compare the server fingerprint of a status message with a server fingerprint stored on the second routing device; and
- to change the primary server to another of the first and second servers in response to a comparison of the primary server fingerprint yielding a mismatch prior to the change.

16. The system of claim 9, further comprising at least one slave server in communication with the first and second servers.

17. The system of claim 16, further comprising at least one additional routing device in secure communication with the second server and with the at least one slave server, the at least one additional routing device configured
- to route traffic from the at least one slave server exclusively to a primary server of the first and second servers,
- to receive the status messages from the first and second servers, to compare the server fingerprint of a status message with a server fingerprint stored on the at least one additional routing device; and
- to change the primary server to another of the first and second servers in response to a comparison of the primary server fingerprint yielding a mismatch prior to the change.

* * * * *